(12) United States Patent
Miao et al.

(10) Patent No.: US 9,519,092 B1
(45) Date of Patent: Dec. 13, 2016

(54) DISPLAY METHOD

(75) Inventors: Xiaoyu Miao, Sunnyvale, CA (US);
Ehsan Saeedi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1009 days.

(21) Appl. No.: 13/426,474

(22) Filed: Mar. 21, 2012

(51) Int. Cl.
*G02B 5/30* (2006.01)
*G02B 27/28* (2006.01)
*G02B 27/01* (2006.01)

(52) U.S. Cl.
CPC ......... *G02B 5/3083* (2013.01); *G02B 27/0172* (2013.01); *G02B 27/283* (2013.01); *G02B 27/286* (2013.01)

(58) Field of Classification Search
CPC . G02B 5/3083; G02B 27/0172; G02B 27/283; G02B 27/286
USPC ................. 359/489.07, 489.09, 630, 489.16, 631,359/633; 349/76, 117, 96; 345/8
See application file for complete search history.

(56) References Cited

U.S. PATENT DOCUMENTS

| 4,117,265 A * | 9/1978 | Gerlach ............... G02B 6/0006 704/276 |
| 4,195,918 A * | 4/1980 | Freche ..................... A61B 1/07 128/201.12 |
| 4,272,764 A * | 6/1981 | Herr ........................ G08B 21/06 340/575 |
| 4,711,512 A | 12/1987 | Upatnieks |
| 5,076,664 A | 12/1991 | Migozzi |
| 5,076,682 A * | 12/1991 | Pasfield ................. G02B 7/002 351/158 |
| 5,093,567 A | 3/1992 | Staveley |
| 5,526,184 A * | 6/1996 | Tokuhashi et al. ........... 359/630 |
| 5,539,422 A | 7/1996 | Heacock et al. |
| 5,541,767 A * | 7/1996 | Murphy ................ G02B 7/002 351/158 |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |

(Continued)

FOREIGN PATENT DOCUMENTS

| GB | 2272980 A | 6/1994 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Ricky D Shafer
(74) *Attorney, Agent, or Firm* — Blakely Sokoloff Taylor & Zafman LLP (57) ABSTRACT

An apparatus includes an illumination module, an end reflector, and a beam splitter. The illumination module launches display light along a forward propagating path within an eyepiece. The end reflector is disposed at an opposite end of the eyepiece from the illumination module and reflects back the display light traveling along a reverse propagating path. The beam splitter is disposed in the forward propagating path between the end reflector and the illumination module. The beam splitter directs a first portion of the display light traveling along the forward propagating path out a first side of the eyepiece. The beam splitter directs a second portion of the display light traveling along the reverse propagation path out a second side of the eyepiece.

20 Claims, 7 Drawing Sheets

(56) References Cited

U.S. PATENT DOCUMENTS

| | | | |
|---|---|---|---|
| 5,844,530 A | 12/1998 | Tosaki | |
| 5,886,822 A | 3/1999 | Spitzer | |
| 5,896,232 A | 4/1999 | Budd et al. | |
| 5,926,318 A | 7/1999 | Hebert | |
| 5,943,171 A | 8/1999 | Budd et al. | |
| 5,949,583 A | 9/1999 | Rallison et al. | |
| 6,023,253 A * | 2/2000 | Taniguchi et al. | 345/7 |
| 6,023,372 A | 2/2000 | Spitzer et al. | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,346,929 B1 * | 2/2002 | Fukushima | G06F 3/017 345/156 |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |
| 6,640,379 B1 * | 11/2003 | Scribner | G02C 11/08 15/250.27 |
| 6,690,516 B2 | 2/2004 | Aritake et al. | |
| 6,701,038 B2 | 3/2004 | Rensing et al. | |
| 6,724,354 B1 | 4/2004 | Spitzer | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 6,880,931 B2 | 4/2005 | Moliton et al. | |
| 7,059,717 B2 * | 6/2006 | Bloch | G02C 3/003 351/119 |
| 7,158,096 B1 | 1/2007 | Spitzer | |
| 7,242,527 B2 | 7/2007 | Spitzer et al. | |
| 7,255,437 B2 * | 8/2007 | Howell | G02C 11/10 351/158 |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 8,000,020 B2 | 8/2011 | Amitai | |
| 8,004,765 B2 | 8/2011 | Amitai | |
| 8,310,555 B2 * | 11/2012 | Ludlow | A61F 9/029 348/143 |
| 8,471,967 B2 * | 6/2013 | Miao et al. | 349/11 |
| 8,643,948 B2 * | 2/2014 | Amitai et al. | 359/489.07 |
| 8,749,886 B2 * | 6/2014 | Gupta | 359/489.09 |
| 8,760,765 B2 * | 6/2014 | Gupta | 359/630 |
| 8,767,305 B2 * | 7/2014 | Spitzer et al. | 359/630 |
| 8,867,131 B1 * | 10/2014 | Amirparviz | 359/485.03 |
| 8,867,139 B2 * | 10/2014 | Gupta | 359/631 |
| 2001/0013972 A1 * | 8/2001 | Doany et al. | 359/495 |
| 2001/0055152 A1 * | 12/2001 | Richards | 359/462 |
| 2003/0090439 A1 | 5/2003 | Spitzer et al. | |
| 2005/0174651 A1 | 8/2005 | Spitzer et al. | |
| 2005/0180021 A1 * | 8/2005 | Travers | 359/630 |
| 2006/0192306 A1 | 8/2006 | Giller et al. | |
| 2006/0192307 A1 | 8/2006 | Giller et al. | |
| 2008/0219025 A1 | 9/2008 | Spitzer et al. | |
| 2009/0122414 A1 | 5/2009 | Amitai | |
| 2010/0046070 A1 | 2/2010 | Mukawa | |
| 2010/0103078 A1 | 4/2010 | Mukawa et al. | |
| 2010/0149073 A1 | 6/2010 | Chaum et al. | |
| 2010/0278480 A1 | 11/2010 | Vasylyev | |
| 2011/0213664 A1 | 9/2011 | Osterhout et al. | |
| 2013/0070338 A1 * | 3/2013 | Gupta et al. | 359/485.05 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

\* cited by examiner

FIG. 7

DISPLAY METHOD

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and a method of operation for a head mounted display ("HMD") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
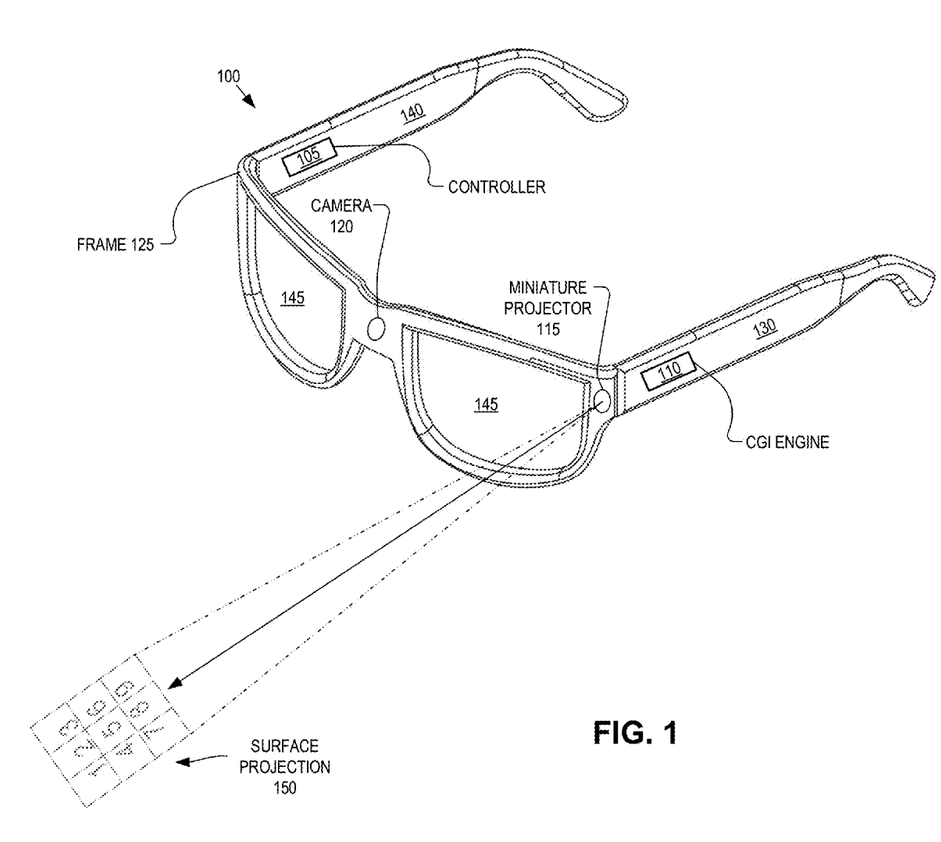
FIG. 1 is a perspective view of wearable glasses for human-computer interaction including a projector and a camera, in accordance with an embodiment of the disclosure.

FIG. 1 is a perspective view of wearable glasses 100 for human-computer interaction including a miniature projector 115 and a camera 120, in accordance with an embodiment of the disclosure. The illustrated embodiment of wearable glasses 100 has lenses 145 disposed in a frame 125 that includes left temple arm 130 and right temple arm 140. Although FIG. 1 illustrates a tradition eyeglass frame 125, embodiments of the present invention are applicable to a wide variety of frame types and styles (e.g. visor, headband, goggles). Lenses 145 may or may not be corrective lenses with optical power and in some embodiments, may even be omitted.

Wearable glasses 100 may include a controller 105 disposed in right temple arm 140 and a computer generated image ("CGI") engine 110 disposed in left temple arm 130. Controller 105 and CGI engine 110 may be disposed in other locations in wearable glasses 100. Controller 105 may include an integrated circuit with hardware, firmware, or software logic. CGI engine 110 may include a processor and graphics engine for rendering image data. In one embodiment, controller 105 and CGI engine 110 are combined in one integrated-chip. Controller 105 may be used to receive, transmit, and process data and communicate with CGI engine 110.

The illustrated embodiment of wearable glasses 100 includes a miniature projector 115 and a camera 120 disposed in frame 125. Miniature projector 115 and camera 120 may be located in different locations in the frame and more than one camera or projector may be utilized in some embodiments. CGI engine 110 generates images that are transmitted to miniature projector 115 for projection. Miniature projector 115 may project a surface projection 150 to facilitate user input. The illustrated embodiment shows surface projection 150 as a numeric keypad showing the numbers one through nine. However, surface projection 150 could be a full QWERTY keyboard, a document, a webpage, or other projectable images.

Camera 120 may be used to monitor user interaction with surface projection 150. For calibration purposes, miniature projector 115 may project a calibration image for the user to interact with. Camera 120 may then take images of the user interacting with specific points on the calibration image and those images could be processed to establish spatial data points to compare to the user's interaction with future projections. Using the spatial data points established in calibration, camera 120 may monitor a number input sequence by a user where the user is interacting with surface projection 150. Camera 120 may report the number input sequence to controller 105 for processing and controller 105 may instruct CGI engine 110 to generate an image based on the user interaction. In one embodiment, camera 120 may monitor user gestures (e.g. a wave of a user's hand) as inputs for browsing a webpage, viewing pictures, flip pages, or otherwise.

Figure 2:
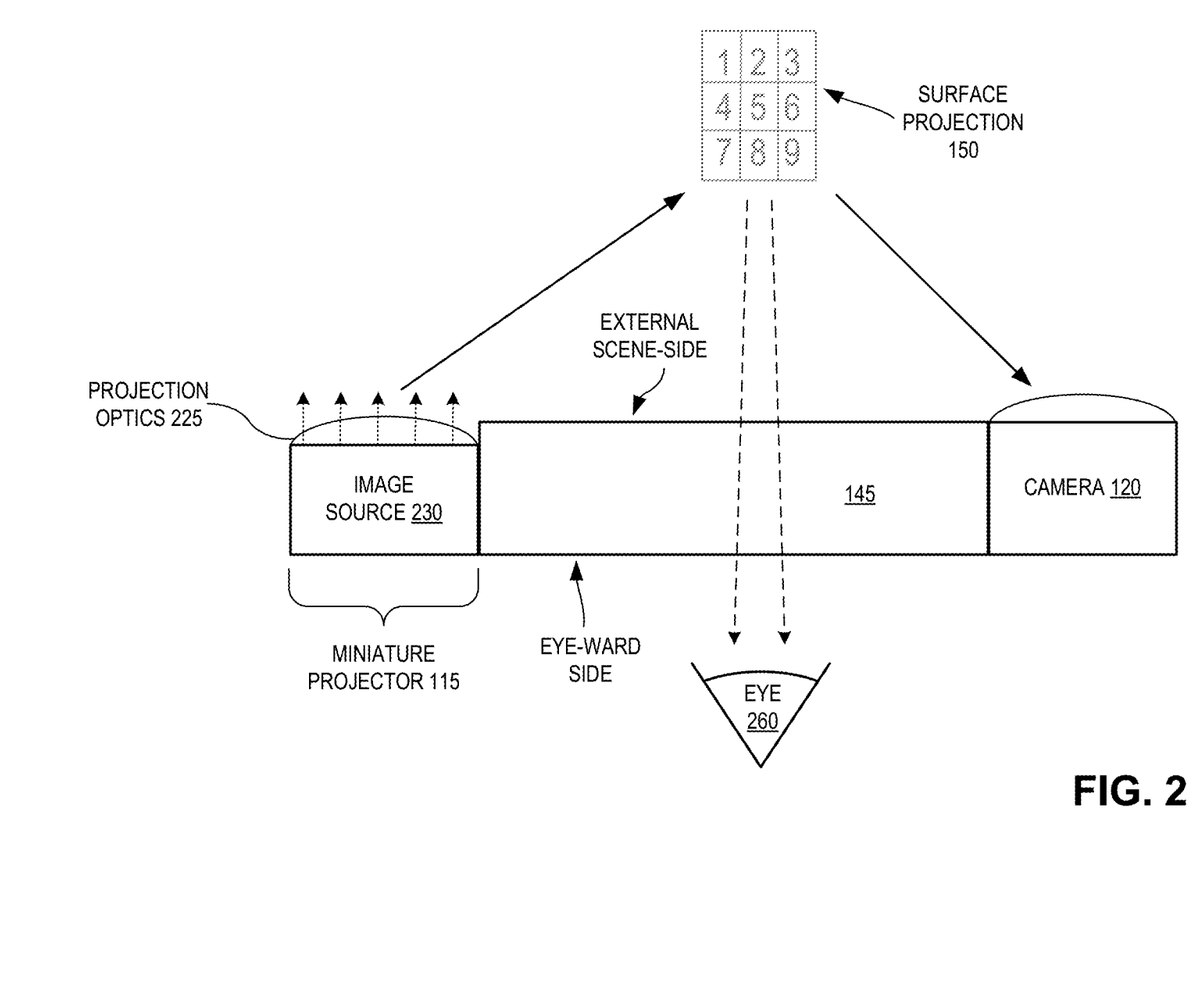
FIG. 2 is a top cross-sectional view of a section of wearable glasses for human-computer interface, in accordance with an embodiment of the disclosure.

FIG. 2 is a top cross-sectional view of a portion of wearable glasses 100, in accordance with an embodiment of the disclosure. In the illustrated embodiment, miniature projector 115 includes an image source 230 and projection optics 225 for focusing an image on an external scene-side of lenses 145. Projection optics 225 may be implemented by a refractive lens made from plastic or glass, a diffractive lens, a Fresnel lens, or otherwise. Image source 230 may be implemented by a light emitting diode ("LED") array, an organic LED ("OLED") array, or by quantum dots. Image source 230 may also be implemented by a liquid crystal display ("LCD") backlit by a light source (e.g. laser, LED, or bulb) or a liquid crystal on silicon ("LCOS") panel reflecting a light source. When a laser is used as the light source, miniature projector 115 may be better able to project a useable image on curved surfaces.

When a first user (wearing wearable glasses 100) wants to show a second user a document, video, or picture, the first user can simply project the content onto a surface for viewing. Eye 260 of the first user of the wearable glasses can look through lens 145 and see surface projection 150. Surface projection 150 may also be user-interactive (e.g. typing on virtual keyboard) in addition to simply displaying content for viewing. Further, surface projection 150 may be user-interactive with users not wearing wearable glasses 100. For example, a person wearing wearable glasses 100 may want to project a virtual keyboard for another person to type on or project a schematic drawing program for another person to modify a schematic. Camera 120 may monitor the user interaction with surface projection 150 as an input to controller 105. The shared nature of wearable glasses 100 may also allow for multi-player gaming applications with one or more users wearing wearable glasses 100.

Figure 3:
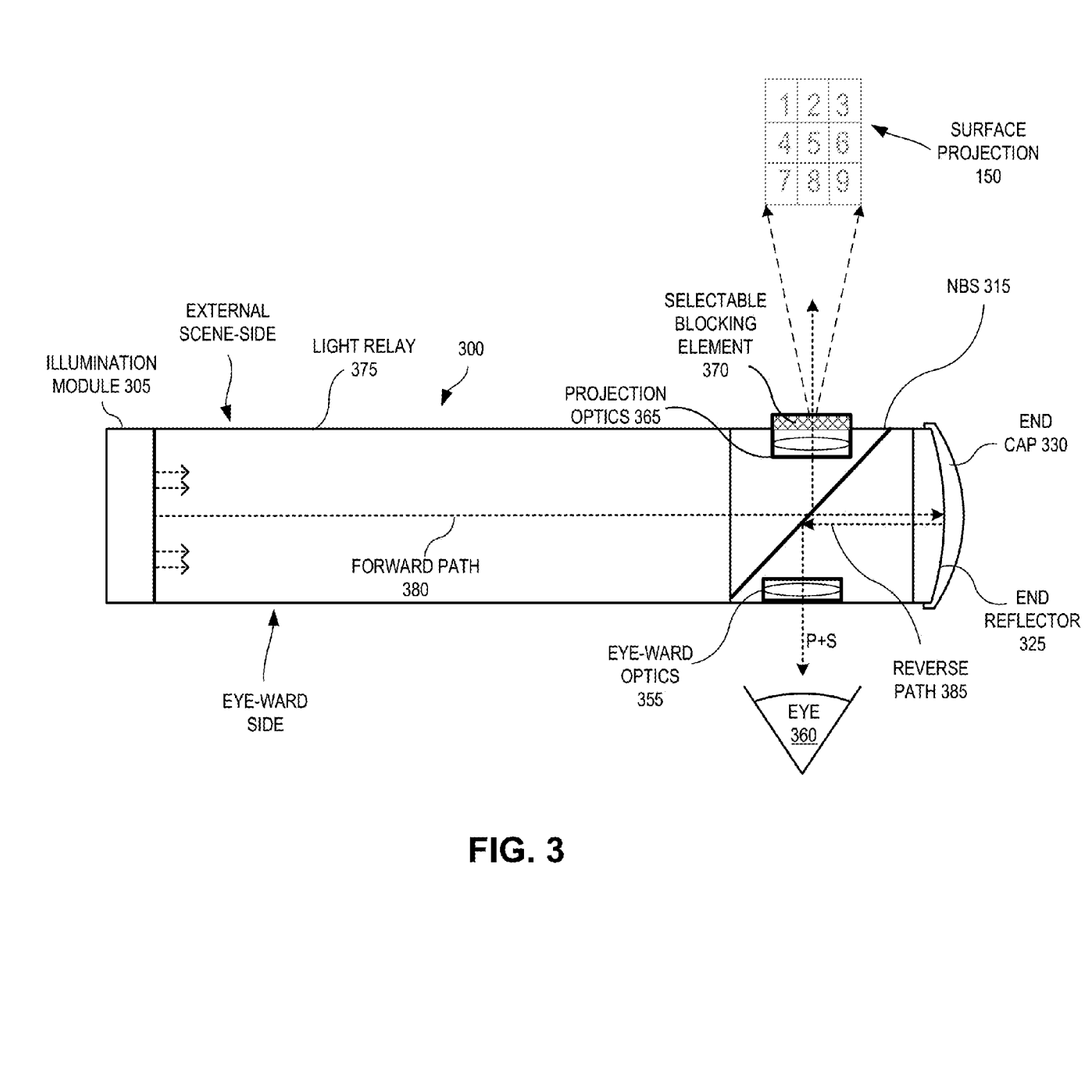
FIG. 3 is a top cross-sectional view of an eyepiece optical system, in accordance with an embodiment of the disclosure.

FIG. 3 is a top cross-sectional view of an eyepiece 300, in accordance with an embodiment of the disclosure. Eyepiece 300 may be integrated into wearable glasses 100. The illustrated embodiment of eyepiece 300 includes an illumination module 305, a light relay 375, a non-polarizing beam splitter ("NBS") 315, an end reflector 325, and an end cap 330. Illumination module 305 may be implemented by a light emitting diode ("LED") array, an organic LED ("OLED") array, a quantum dot array, or otherwise. Illumination module 305 may also be implemented by a light source (e.g. laser, LED, or bulb) backlighting an LCD display or a liquid crystal on silicon ("LCOS") panel reflecting a light source. End reflector 325 may be a concave mirror.

The illustrated embodiment of eyepiece 300 also includes eye-ward optics 355 on an eye-ward side of eyepiece 300 for focusing private projections (intended only for the eyes of the user) into an eye 360 of a user wearing wearable glasses that include eyepiece 300. Eyepiece 300 may include projection optics 365 on a external scene-side of eyepiece 300 for focusing public projections, such as surface projection 150, onto a surface. Projection optics 365 and eye-ward optics 355 may not be necessary for a highly collimated source (e.g. laser). The illustrated embodiment of projection optics 365 includes a selectable blocking element 370 that, when activated, will prevent a public projection from being externally projected. The selectable blocking element 370 may be a mechanical shutter, a neutral density filter controlled by a voltage (e.g. LCD shutter), or otherwise.

Illumination module 305 launches CGI light (which may be generically referred to as display light) along a forward path 380 toward NBS 315. Light relay 375 has a transparent structure to permit the CGI light to pass through along forward path 380. Light relay 375 may be fabricated of a solid transparent material (e.g., glass, quartz, acrylic, clear plastic, PMMA, ZEONEX-E48R, etc.) or be implemented as a solid housing having an inner air gap through which the CGI light passes. Light relay 375 operates to protect the optical path, but may not use total internal reflection ("TIR") to guide or confine the CGI light.

After the CGI light along forward path 380 passes through light relay 375, NBS 315 reflects a first portion of the CGI light towards the external scene-side of eyepiece 300 and passes a second portion of the CGI light. In one embodiment, NBS 315 is a 45 degree 50/50 NBS, meaning it reflects 50 percent of light and passes the other 50 percent of light. The CGI light passed by NBS 315 continues along forward path 380 and end reflector 325 reflects back the CGI light along a reverse path 385. The CGI light along reverse path 385 encounters NBS 315, which reflects a portion of the CGI light along reverse path 385 toward an eye-ward side of eyepiece 300. The CGI light reflected toward the eye-ward side of eyepiece 300 may encounter eye-ward optics 355. Eye-ward optics 355 may rotate and/or focus the CGI light for eye 360. In one embodiment, NBS 315 may pass a smaller portion of light than it reflects to adjust the brightness of the CGI light for projection into eye 360.

The illustrated embodiment of FIG. 3 allows the CGI light launched by illumination module 305 to be projected into eye 360 of a user and onto an external surface at the same time. Additionally, if the user prefers to keep the CGI light private, the user can activate selectable blocking element 370 to prevent the public projection. The user may activate selectable blocking element 370 by a gesture that is captured by camera 120 in wearable glasses 100. The user may also activate selectable blocking element 370 by contacting a touch-sensitive user interface disposed in wearable glasses 100. The user interface may be disposed in left temple arm 130 or right temple arm 140 and the user interface may be coupled to controller 105.

Figure 4A:
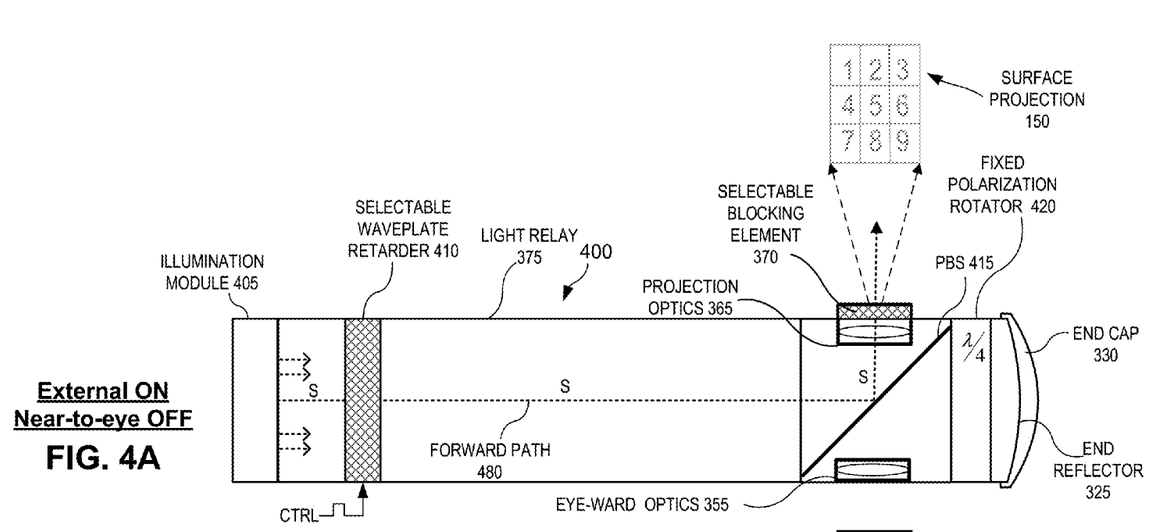
FIGS. 4A and 4B are top cross-sectional views of an eyepiece optical system, in accordance with an embodiment of the disclosure.
Figure 4B:
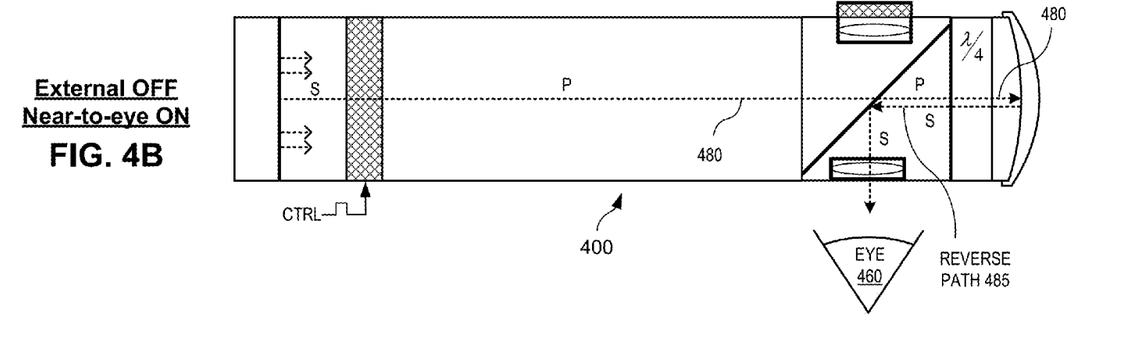

FIGS. 4A and 4B are top cross-sectional views of an eyepiece 400, in accordance with an embodiment of the disclosure. Eyepiece 400 may be integrated into wearable glasses 100. The illustrated embodiment of eyepiece 400 includes illumination module 405, a selectable waveplate retarder 410, light relay 375, a polarizing beam splitter ("PBS") 415, a fixed polarization rotator 420, end reflector 325, and end cap 330. The illustrated embodiment also includes eye-ward optics 355 and projection optics 365 that include selectable blocking element 370. Illumination module 405 emits polarized light and may be implemented by combining a polarized material with a light emitting diode ("LED") array, an organic LED ("OLED") array, a quantum dot array, or otherwise. Illumination module 405 may be implemented by a polarized light source backlighting an LCD display or a liquid crystal on silicon ("LCOS") panel reflecting a polarized light source, or otherwise. A polarized material may be combined with a laser, LED, or bulb to form the polarized light source.

Illumination module 405 launches polarized CGI light along forward path 480 toward selectable waveplate retarder 410. Selectable waveplate retarder 410 configures the light to a selected polarization orientation (e.g. "S" or "P" polarization) in response to a received signal. The illustrated embodiment shows a control signal (CTRL) controlling the selection/configuring of the polarization orientation by selectable waveplate retarder 410. The control signal received by selectable waveplate retarder 410 may be a voltage, current, optical signal, or otherwise. The control signal received by selectable waveplate retarder 410 may be received from controller 105 or CGI engine 110. Selectable waveplate retarder 410 may be made from a layer of nematic liquid crystal that configures the polarization of light. In one embodiment, selectable waveplate retarder 410 is a one-half wavelength polarization rotator that configures the polarization orientation of light when receiving a voltage signal.

In FIG. 4A, the CGI light launched by illumination module 405 is labeled with an "S" to indicate a first polarization orientation. The signal controlling selectable waveplate retarder 410 causes selectable waveplate retarder 410 to keep the polarization orientation of the CGI light unchanged in FIG. 4A. So, S polarized CGI light continues along forward path 480 and PBS 415 reflects the S polarized CGI light toward an external scene-side of eyepiece 400. Therefore, in FIG. 4A, the public, external projection of CGI light is "ON", while there is no private, near-to-eye projection. The S polarized CGI light may travel through projection optics 365 to focus the S polarized CGI light on a surface. Projection optics 365 may include selectable blocking element 370 to prevent a public projection of the S polarized CGI light.

In FIG. 4B, the CGI light launched by illumination module 405 is still labeled with an "S" to indicate the polarization orientation. However, in the illustrated embodiment, the signal controlling selectable waveplate retarder 410 causes selectable waveplate retarder 410 to rotate the S polarized CGI light 90 degrees to a "P" polarization orientation. The rotated P polarized CGI light continues along forward path 480 and PBS 415 passes the P polarized CGI light. One skilled in the art will appreciate that the passed P polarized CGI light could be directed into an eye of a user in a variety of different optical schemes. In the illustrated embodiment, the passed P polarized CGI light goes through fixed polarization rotator 420, reflects off of end reflector 325 on reverse path 485, passes back through fixed polarization rotator 420, and reflects off PBS 415 into eye 460 of a user. In the illustrated embodiment, fixed polarization rotator 420 is a one-quarter wavelength rotator, which rotates light approximately 45 degrees. The P polarized CGI light passed by PBS 415 is rotated approximately 45 degrees on forward path 480, reflects off end reflector 325 and is rotated approximately 45 degrees on reverse path 485. The result is that the polarized CGI light has the S polarization orientation (as labeled in FIG. 4B) coming out of fixed polarization rotator 420 on reverse path 485. PBS 415 reflects the S polarized CGI light toward an eye-ward side of eyepiece 400. The S polarized CGI light reflected toward the eye-ward side of eyepiece 400 may travel through eye-ward optics 355 to prepare the light for eye 460 of a user.

FIG. 4A and FIG. 4B show that selectable waveplate retarder 410 controls whether the polarized CGI light will be privately projected into an eye of a user or publicly projected onto an external surface. One or more inputs may control (directly or through controller 110) selectable waveplate retarder 410. In one embodiment, a user interface disposed in wearable glasses 100 controls whether there is a private or a public projection. The user interface may be a touch-sensitive user interface disposed in left temple arm 130 or right temple arm 140. In one embodiment, a gesture made by the user and monitored by camera 120 serves as an input that controls selectable waveplate retarder 410. In another embodiment, data associated with the CGI controls whether the CGI is projected publicly or privately. For example, a confidential document may have date embedded in the image file that limits a projection of the confidential document to a private projection into the eye of a user. In that case, the embedded data (processed by controller 110 or CGI engine 105) would cause selectable waveplate retarder 410 to rotate the polarized CGI light to pass through PBS 415 towards the ultimate destination of eye 460.

In one embodiment, selectable waveplate retarder 410 alternates between rotating the polarized CGI light and not rotating the polarized CGI light. When this happens at a high enough modulation rate, it may appear to the human eye that there is both a public, external projection and a private, near-to-eye projection at the same time. For example, if the signal controlling selectable waveplate retarder 410 was a 120 Hertz square-wave, the human eye may perceive both a private and a public projection, even though the CGI light would be a public projection a portion of the time and a private projection for the other portion of the time. In one embodiment, the portion of time that that the public projection or the private projection is projected is tuned as a way to control the brightness of each projection. In one embodiment, the polarized CGI light launched by illumination module 405 includes public CGI light and private CGI light. The public CGI light and the private CGI light may be interlaced and launched in sync with the signal that controls selectable waveplate retarder 410. The in sync signal (which may be at 60 Hertz or higher) may cause the selectable waveplate retarder to give the public CGI light a first polarization orientation (illustrated as "S" in FIG. 4A) and the private CGI light a second polarization (illustrated as "P" in FIG. 4B). The result of the high frequency interlacing of the public and the private CGI may allow private CGI light to be viewed by only the user, while the public CGI light is viewed by the users and others. In one embodiment, the user may not notice a difference between the private CGI light and the public CGI light. In one embodiment, the private CGI light is differentiated from the public CGI light (e.g. color coded) to show the user what image or data is private.

There may be several practical or leisure applications for eyepiece 400 when it is configured to interlace public and private CGI light at a modulation rate imperceptible to the human eye. In one embodiment, a document could be displayed publicly for more than one person to see, while a private projection of confidential information pertaining to the publicly projected document is projected into the eye of the user/wearer of eyepiece 400. In one embodiment, the public projection is a virtual keyboard and the private projection is a word processing display of the text that has been entered that allows the user to view what she has written. This arrangement will keep a document or an email authored by the user confidential. In one embodiment, a game board could be projected publicly for players to view, while a solution to the game board could be projected privately into the eye of the user/wearer of eyepiece 400. Interlacing public and private CGI light may yield power efficiencies because one projector can be used for projecting both public and private CGI light.

Figure 5:
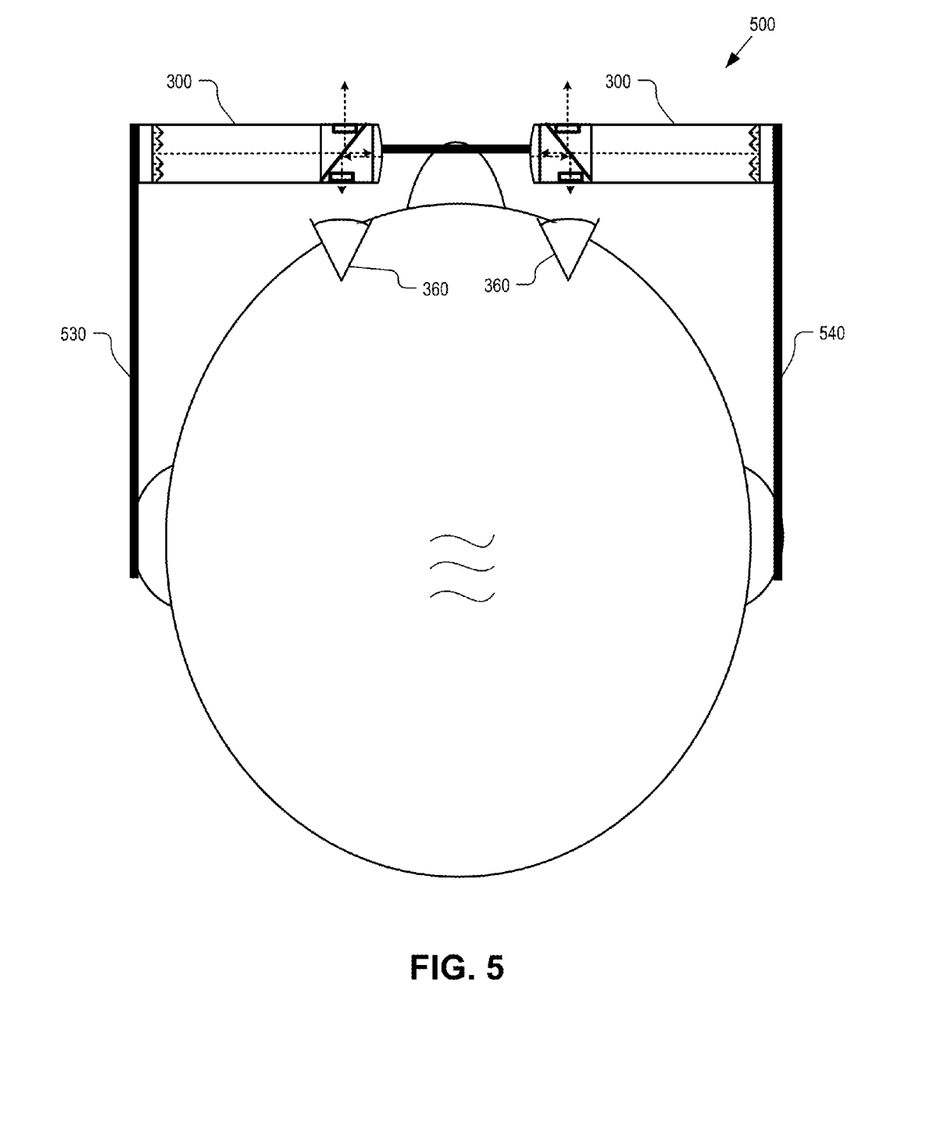
FIG. 5 is a top view of a user wearing a binocular HMD implanted with eyepieces, in accordance with an embodiment of the disclosure.

FIG. 5 is a top view of a user wearing a binocular HMD 500 implanted with eyepieces 300, in accordance with an embodiment of the disclosure. HMD 500 includes left temple arm 530 and right temple arm 540 positioned above the user's ears. Eyepieces 300 are positioned to project the CGI light into eyes 360 of a user and onto an external scene-side surface. Although FIG. 5 illustrates a binocular HMD having two of eyepiece 300, one for each eye 360, an HMD may also be implemented as a monocular HMD including only a single eyepiece positioned to project CGI to a single eye. And, HMD 500 is illustrated as being implanted with eyepieces 300, however, an HMD may be implanted with eyepieces 400.

Figure 6:
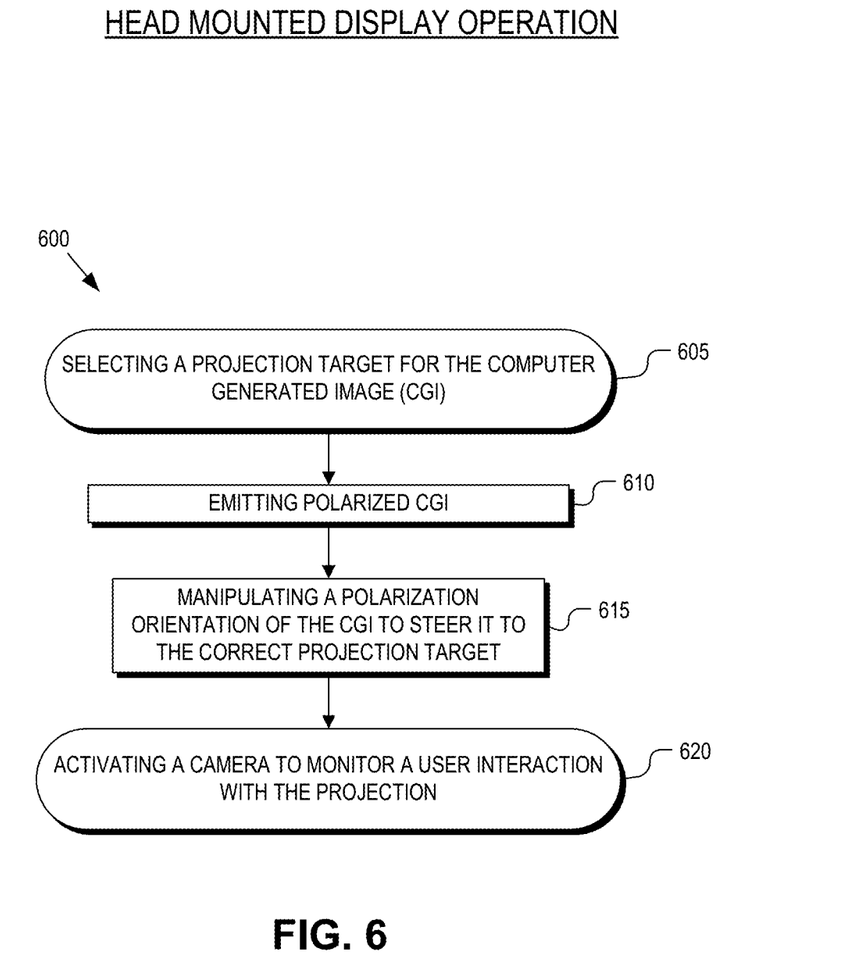
FIG. 6 is a flow chart illustrating a process of operation of an HMD for displaying CGI, in accordance with an embodiment of the disclosure.

FIG. 6 is a flow chart illustrating a process 600 of operation of an HMD, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, a projection target is selected for projection of polarized CGI light. Either a surface external to the HMD (public projection) or the eye of a user (private projection) of the HMD is selected as the projection target. An input from a user interface disposed in the HMD may determine which projection target is selected. Data associated with CGI that will be displayed may also determine which projection target is selected. In process block 610, polarized CGI light is emitted (or launched) from an illumination module (e.g. illumination module 405). In process block 615, a polarization orientation of the polarized CGI light is manipulated to steer the CGI light to the correct projection target. One way of manipulating the CGI light is using selectable waveplate retarder 410. Manipulating the polarization orientation of the CGI light may direct it to the projection target because special optics (e.g. PBS 415) reflect light having one polarization orientation and pass light having a second polarization orientation. In process block 620, a camera is activated to monitor a user interaction with the projection. The camera can be activated to monitor a user interaction with a private projection as well as a public projection. For example, if the user is viewing a private projection of pictures, the camera may monitor hand motions or gestures that enable browsing through the pictures. For public projections, the camera may monitor a projected virtual keyboard that the user (or another person) uses to input data.

Figure 7:
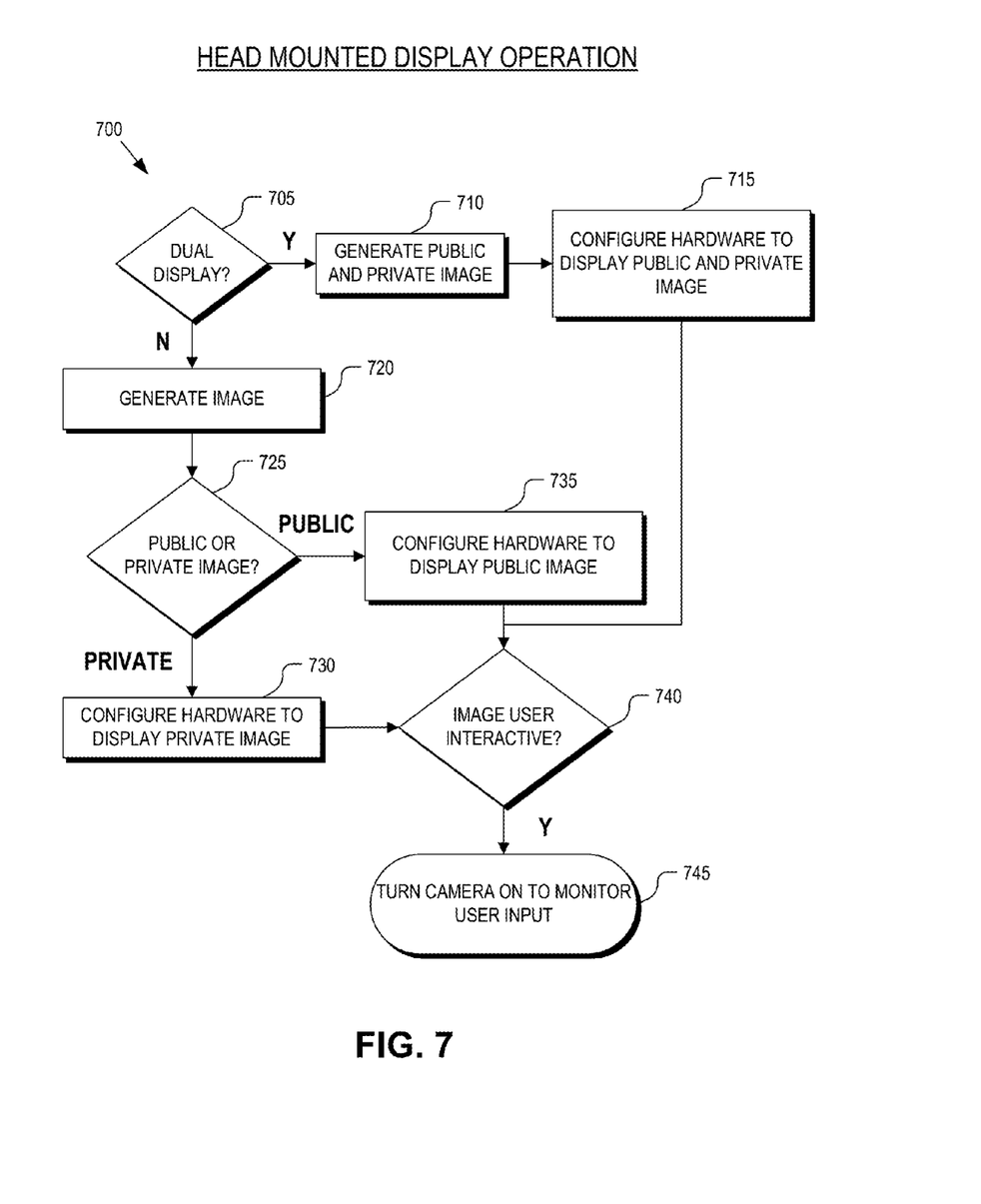
FIG. 7 is a flow chart illustrating a process of operation of an HMD for displaying CGI, in accordance with an embodiment of the disclosure.

FIG. 7 is a flow chart illustrating a process 700 of operation of an HMD for displaying CGI, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, a determination is made regarding whether two displays (or projections) will be utilized. If two displays will be utilized, a public and a private image is provided (process block 710). In process block 715, hardware is configured to display the public and the private image. In process block 705, if only one display will be utilized, an image is provided (process block 720), and a determination is made as to whether that image will be displayed publicly or privately (process block 725). If the image is to be displayed privately, hardware is configured to display the image privately (process block 730). If the image is to be displayed publicly, hardware is configured to display the image publicly (process block 735). At process block 740, a determination is made as to whether a displayed image will be user interactive. If the display (or projection) will be user interactive, then a camera (located on the HMD) is turned on to monitor the user input or user interaction with the display (process block 745).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. An apparatus comprising:
an illumination module for launching display light along a forward propagating path within an eyepiece, wherein the display light is polarized;
an end reflector disposed at an opposite end of the eyepiece from the illumination module to reflect back the display light along a reverse propagating path;
a selectable waveplate retarder disposed within the eyepiece along the forward propagating path, wherein the selectable waveplate retarder causes all of the display light to have a first polarization orientation when receiving a first signal and causes all of the display light to have a second polarization orientation when receiving a second signal;
a polarizing beam splitter disposed within the eyepiece between the end reflector and the selectable waveplate retarder for directing the display light traveling along the forward propagating path out a first side of the eyepiece to provide a public image for public viewing when the first signal is received and directing the display light traveling along the reverse propagating path out a second side of the eyepiece to provide a private image for private viewing when the second signal is received; and
a polarization rotator disposed between the polarizing beam splitter and the end reflector,
wherein emission of the public image from the first side or emission of the private image from the second side is user selectable.

2. The apparatus of claim 1, wherein the first side of the eyepiece is an external scene-side of the eyepiece and the second side of the eyepiece is an eye-ward side of the eyepiece.

3. The apparatus of claim 1, further comprising eye-ward optics positioned to focus the display light directed out the second side of the eyepiece.

4. The apparatus of claim 1, further comprising projection optics positioned to focus the display light directed out the first side of the eyepiece.

5. The apparatus of claim 4, wherein the projection optics includes a selectable blocking element to selectively block the display light being directed out the first side of the eyepiece.

6. The apparatus of claim 1, wherein the polarization rotator is a fixed one-quarter wave plate polarization rotator.

7. The apparatus of claim 1, wherein the eyepiece is mounted to a frame assembly.

8. The apparatus of claim 7, further comprising a camera mounted to the frame assembly and oriented to monitor a user interaction with a projection of the display light.

9. The apparatus of claim 1, wherein the illumination module includes a liquid crystal on silicon ("LCOS") display panel.

10. The apparatus of claim 1, wherein the selectable waveplate retarder includes a layer of nematic liquid crystal.

11. An apparatus for a head mounted display ("HMD"), the apparatus comprising:
an illumination module for launching display light along a forward propagating path within an eyepiece;
an end reflector disposed at an opposite end of the eyepiece from the illumination module to reflect back a private portion of the display light along a reverse propagating path;
a beam splitter disposed in the forward propagating path between the end reflector and the illumination module for directing a public portion of the display light traveling along the forward propagating path out an external scene-side of the eyepiece, passing the private portion of the display light traveling along the forward propagating path to the end reflector, and directing the private portion of the display light traveling along the reverse propagating path out an eye-ward side of the eyepiece;
projection optics that include a selectable blocking element to selectively block the public portion of the display light from being directed out the external scene-side of the eyepiece;
a selectable waveplate retarder disposed within the eyepiece in the forward propagating path between the illumination module and the beam splitter, the selectable waveplate retarder causing the public portion of the display light to have a first polarization orientation when receiving a first signal and causing the private portion of the display light to have a second polarization orientation when receiving a second signal; and
a fixed polarization rotator disposed in the forward propagating path and in the reverse propagating path between the beam splitter and the end reflector,
wherein the public portion of the display light is launched by the illumination module during a first time period and the private portion of the display light is launched by the illumination module during a second time period, and wherein the display light is polarized and the beam splitter is a polarizing beam splitter.

12. The apparatus of claim 11, further comprising eye-ward optics positioned to focus the private portion of the display light onto an eye of a user.

13. The apparatus of claim 11, further comprising a camera oriented to monitor a user interaction with a projection of the display light.

14. An apparatus comprising:
an illumination module for launching display light along a forward propagating path within an eyepiece, wherein the display light is polarized;
an end reflector disposed at an opposite end of the eyepiece from the illumination module to reflect back the display light along a reverse propagating path;
a selectable waveplate retarder disposed within the eyepiece along the forward propagating path, wherein the selectable waveplate retarder causes the display light to have a first polarization orientation when receiving a first signal and causes the display light to have a second polarization orientation when receiving a second signal;
a polarizing beam splitter disposed within the eyepiece between the end reflector and the selectable waveplate retarder for directing the display light traveling along the forward propagating path out a first side of the eyepiece when the first signal is received and directing the display light traveling along the reverse propagating path out a second side of the eyepiece when the second signal is received; and
a polarization rotator disposed between the polarizing beam splitter and the end reflector, wherein the display light includes public display light and private display light, and wherein the illumination module interlaces the private display light with the public display light, and wherein the public display light is output in sync with the first signal and the private display light is output in sync with the second signal.

15. The apparatus of claim 14, wherein a first voltage level of a timing signal is the first signal and a second voltage level of the timing signal is the second signal, and wherein a frequency between the first voltage level and the second voltage level of the timing signal is high enough to make the interlacing of the public display light and the private display light substantially imperceptible to a human eye.

16. The apparatus of claim 14, wherein the first side of the eyepiece is an external scene-side of the eyepiece and the second side of the eyepiece is an eye-ward side of the eyepiece.

17. The apparatus of claim 14, further comprising eye-ward optics positioned to focus the display light directed out the second side of the eyepiece.

18. The apparatus of claim 14, further comprising projection optics positioned to focus the display light directed out the first side of the eyepiece.

19. The apparatus of claim 18, wherein the projection optics includes a selectable blocking element to selectively block the display light being directed out the first side of the eyepiece.

20. The apparatus of claim 14, wherein the polarization rotator is a fixed one-quarter wave plate polarization rotator.

* * * * *